United States Patent Office 3,459,001
Patented Aug. 5, 1969

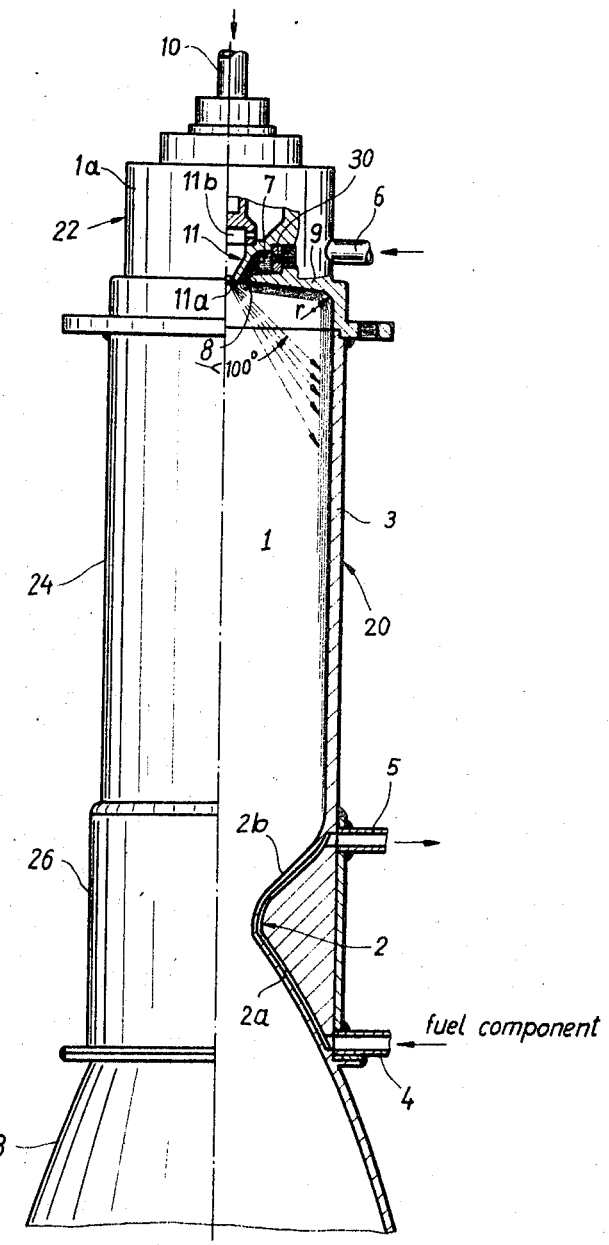

3,459,001
ROCKET PROPELLANT INJECTION AND
COOLING DEVICE AND METHOD
German Munding, Bad Friedrichshall-Kochendorf, Germany, assignor to Bolkow Gesellschaft mit beschrankter Haftung, Ottobrunn, near Munich, Germany
Continuation of application Ser. No. 449,477, Apr. 20, 1965. This application June 16, 1967, Ser. No. 646,737
Claims priority, application Germany, Apr. 22, 1964,
B 76,453
Int. Cl. F02k 9/02
U.S. Cl. 60—258
6 Claims

ABSTRACT OF THE DISCLOSURE

A method of operating a combustion chamber using propellant components which interact hypergolically comprises introducing an oxygen carrier propellant component into the combustion chamber from a closed end in a manner to cause it to form into a cooling layer against the combustion chamber wall which extends completely along the length of the combustion chamber in a direction toward the nozzle discharge end thereof. A liquid propellant component in liquid form is introduced centrally into the closed end of the combustion chamber and directed in a direction toward the nozzle discharge end and at an angle and a force to cause the fuel to be directed as droplets onto the oxygen carrier without penetrating the layer so as to flow along with the carrier along the combustion chamber wall as combustion progresses. The apparatus for carrying out the method includes a central opening for a fuel nozzle which is oriented to discharge an atomized spray of liquid fuel at a cone angle of less than 100°. The combustion chamber length is from approximately 0.8 to 1.0 meter.

This application is a continuation of application Ser. No. 449,477 filed Apr. 20, 1965, now abandoned.

This invention relates in general to a rocket combustion chamber construction and to a method of operation thereof, and in particular to a new and useful rocket combustion chamber for liquid propellants having a specific combustion chamber characteristic length of from 0.8 to 1.0 meter and with an expansion nozzle construction providing means for cooling the nozzle at least partly regeneratively by fuel.

In propulsion units for propellants having very high energy contents, the total cooling of the combustion chamber for which the fuel component is normally used in regenerative cooling, represents a problem that is difficult to solve. This difficulty appears particularly in combustion chambers with an unfavorable ratio of surface to volume. It is already known either to cool a combustion chamber jacket or a part thereof regeneratively with one of the fuel components or to provide evaporation, condensation or film cooling, if necessary, with an additional cooling component not participating in the combustion. It is also known to combine regenerative cooling with film or condensation cooling. The cooling methods used involve, however, considerable technical expenditures resulting in great weight of the propulsion unit. On the other hand, it was found that due to the cooling capacity of the two fuel components, the thrust in regeneratively cooled combustion chambers has a lower limit of about 50 kilopounds (kp.). When using film cooling instead of regenerative cooling, impulse losses are expected because the fuel used for the cooling as a rule reacts only partly in the combustion chamber.

In accordance with the present invention, the above disadvantages are completely avoided by providing a combustion chamber constructed in accordance with the invention. In such a combustion chamber it suffices to cool merely a part of the expansion nozzle by regeneration, while the cylindrical part of the combustion chamber ahead of the nozzle is cooled by a film of the oxygen or oxygen carrier deposited on the inner wall of the chamber. With such a construction it is possible to exceed the lower output limits of rocket combustion chambers even in cases where this is otherwise impossible and to select the output values lower than was possible up to now. Combustion chambers of the above-mentioned type can therefore be used with great preference as control propulsion units with low thrust for outer space missiles or flying bodies where the weight of the propulsion unit is of great importance in view of the fact that the high effective load portion in respect to total weight of the missile must be kept as low as possible. The combustion chamber constructed in accordance with the invention is also important when small propulsion units are provided not only for control alone, but also to provide a cruising propulsion unit, that is, to supply a small thrust for a prolonged period of time. In such a case, it is desirable to have a unit which can achieve high specific impulses. A feature of the construction is that the fuel components are introduced in a special manner and the combustion chamber walls are of special geometric configuration so that it is possible to operate with extremely low injection pressures.

The present invention is an improvement over the prior art, particularly in the construction of a combustion chamber of simple, safe, and relatively light weight construction which is sufficiently cooled by providing a cylindrical liquid film surrounding the hot fuel gases by directing one of the combustion components, preferably the specific heavier component, tangentially along the walls of the chamber without requiring additional cooling measures or special materials for the combustion chamber walls and in a manner insuring that a complete combustion inside the combustion chamber takes place at optimum efficiency.

In accordance with the invention, liquid oxygen or oxygen carrier is fed as a coolant by tangential introduction into a turbulence chamber arranged at the inner end of the combustion chamber in a concentric position to discharge through a considerably constrictive cross section compared to the turbulence chamber tangentially against the walls of the combustion chamber. The construction includes means for directing fuel centrally through a nozzle extending in the axial direction of the combustion chamber with an orifice such that the fuel issues conically in a cone angle of less than 100° and is directed against the oxygen film on the interior wall of the combustion chamber but does not have sufficient pressure and force to penetrate this film.

Accordingly it is an object of the invention to provide an improved combustion chamber construction in which a fuel component is introduced at the inner end of a combustion chamber tangentially against the walls thereof to create a cooling film and an additional fuel component is directed centrally of the first fuel component in a direction so that it will be directed against the film in a manner such that it will not penetrate the film.

A further object of the invention is to provide a combustion chamber of a particular geometric configuration having a characteristic length of from 0.8 to 1.0 meter and in which a nozzle or reduced sectional portion of the combustion chamber is cooled by a fuel component which is advantageously circulated from the nozzle portion into the inner end of the combustion chamber.

A further object of the invention is to provide a combustion chamber of particular size and configuration with advantageous combustion and cooling characteristics.

A further object of the invention is to provide a combustion chamber construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawing:

The only figure of the drawing is a partial elevational and partial longitudinal sectional view of a combustion chamber constructed in accordance with the invention.

Referring to the drawing in particular, the invention embodied therein comprises a combustion chamber generally designated 20 which in the embodiment illustrated includes an end piece or end section generally designated 22, a cylindrical center portion or section 24, a nozzle portion or section 26, and an outwardly flaring trailing portion or section 28.

The end piece 22 is made substantially cylindrical and includes a wall 9 which is substantially conical but forms an angle of slightly less than 90° with the center or longitudinal axis of the combustion chamber. The wall 9 is curved to form an opening 8 for the inlet of one fuel component and the curvature at the location of the opening 8 is formed by a radius of the wall 9 which is somewhat less than the radius $r$ which forms a transition of the wall 9 with the interior walls of a cylinder or cylindrical section 3 which forms the intermediate portion 24.

In accordance with the invention the main combustion chamber designated 1 is substantially cylindrical and is bonded at its inner end by the wall 9. The nozzle portion 26 formed at the outer or trailing end of the combustion chamber 1 includes a nozzle 2 forming a throat or nozzle section of smallest diameter. The nozzle 2 includes an interior annular cooling passage 2a which extends parallel to the configuration of the interior nozzle wall and closely adjacent the interior surface 2b thereof. A fuel component is introduced through an inlet conduit 4 connected to one end of the passage 2a and is directed out through a connecting line 5.

A feature of the invention is that a fuel component, preferably the heavier one such as liquid oxygen or oxygen carrier, is fed before it enters the combustion chamber 1 into a connecting line 6 and through a passage defined in the end piece 22 and through an orifice and swirl plate 30 into a turbulence chamber 7. The orifice and swirl plate 30 and the turbulence chamber 7 impart to the fuel as desired turbulence and the fuel is directed through the annular opening 8 which is of a cross section which is considerably constricted with regard to the turbulence chamber 7. The fuel which is directed through the opening 8 and into the combustion chamber 1 is directed with a force and direction such that it will remain in close contact with the wall 9 and the interior of the wall 3 up to the nozzle portion 2.

Fuel which is directed into the conduit 4 and circulated through the annular passage 2a around the nozzle walls 2b provides for cooling of these walls and the pre-heating of the fuel component. This fuel is advantageously directed through the connecting line 5 to the inlet line 10 arranged to enter into the end of the end piece 22. The fuel from the conduit 10 is injected into the combustion chamber 1 via central turbulence nozzle 11 which is advantageously arranged centrally at the inner end of the combustion chamber and directed axially in respect thereto. The nozzle 11 includes a nozzle orifice 11a designed so that it has a far smaller cross section than a cylindrical turbulence chamber 11b. The nozzle orifice 11a lies substantially in the same plane as the annular opening 8 and centrally in respect thereto. The injection pressure for the fuel which is directed through the conduit 10 and out through the nozzle 11 is so proportioned that the fuel particles issue in a conical form making a cone angle of less than 100°. In addition, the fuel particles do not strike against the wall 9 but at a distance therefrom against the fuel film on the interior of the wall 3. The force and direction is such that they will strike against the film of oxygen or oxygen carrier which forms the interior of the wall 3 without penetrating this film, however.

A preferred method of operating the combustion chamber is as follows:

The fuel is first preheated by directing it through a nozzle area where it also provides a cooling effect on the walls of the combustion chamber nozzle 2. Oxygen or oxygen carrier is then directed through an annular opening at a force and velocity to insure that the fuel component will remain close to the end wall and also be directed around the end wall 9 in a desirable flow stream and thereafter adhere to the side walls of the combustion chamber along the length thereof up to the nozzle portion thereof. The fuel itself is advantageously directed through a conduit 10 after being preheated in the nozzle. The fuel is directed toward the film of oxygen at an angle and force, however, which insures that it does not penetrate the film. The cone angle of the centrally introduced fuel is advantageously such so that the fuel will be carried along in an axially flowing direction along the combustion chamber wall along with the oxygen. The oxygen or oxygen carrier thus will give off on its way toward the nozzle portion heat absorbed by the combustion chamber wall to the fuel and the fuel will evaporate. This results at the same time in a mixture of oxygen and fuel in the gaseous phase reaction can take place which is completed before the fuel and oxygen enter the nozzle section.

It should be appreciated that the invention is particularly directed to a combustion chamber construction in which there is regenerative cooling in the range of the nozzle of the combustion chamber. The invention finds particular application in respect to a combustion chamber having a specific combustion chamber length L in the range of from 0.8 to 1.0 meter.

While a specific embodiment of the invention has been shown and described in detail to illustrate the application of the inventive principles, it will be understood that the invention may be embodied otherwise without departing from such principles.

What is claimed is:

1. A method of operating a combustion chamber having a closed end and an opposite open end with a nozzle portion adjacent said open end and using propellant components which interact hypergolically, comprising introducing an oxygen carrier propellant component into the combustion chamber from the closed end in a manner to cause it to form into a cooling layer against the combustion chamber wall which extends completely around and along the combustion chamber wall in a direction toward the nozzle portion, and directing a liquid propellant component in liquid form centrally into the closed end of the combustion chamber in a direction toward the nozzle portion and at an angle and a force to cause the propellant component to be directed as droplets onto the oxygen carrier without penetrating the layer so as to flow along with the carrier along the combustion chamber as combustion progresses.

2. A rocket engine construction for use with fuels which interact hypergolically comprising a substantially cylindrical combustion chamber having a closed end and an open end with an interior nozzle portion adjacent said open end, means adjacent said closed end for directing an oxygen carrier into said combustion chamber at a velocity force and direction such that it is swirled around the walls of the combustion chamber in a layer which decreases in thickness toward the nozzle portion, and a liquid fuel nozzle for directing fuel centrally into said combustion chamber in the form of droplets which are directed at an angle against the layer of said oxygen carrier with a force and direction such that the droplets ride on the layer but do not penetrate the layer.

3. A method according to claim 1, wherein said liquid propellant component is directed centrally into said combustion chamber from the closed end thereof in the form of a cone having a cone angle of less than 100° to cause it to strike against the oxygen carrier at a spaced location from the closed end of said combustion chamber but at a velocity and pressure such that the liquid propellant component will not penetrate the film of the oxygen carrier.

4. A method according to claim 1, wherein said liquid propellant component is sprayed into the combustion chamber at a cone angle of less than 100°.

5. A rocket engine construction according to claim 2, wherein said combustion chamber includes a substantially cylindrical main section having a specific combustion chamber length of from 0.8 to 1.0 meter, said nozzle portion including a section having a coolant passage defined therethrough for the passage of a coolant adjacent the interior wall of said nozzle section, and means for directing a fuel component into said coolant passage to cool said nozzle section and for thereafter delivering said fuel to said liquid nozzle.

6. A rocket engine construction according to claim 2, wherein said closed end of said combustion chamber includes a wall disposed at substantially 90° to the axis of said chamber, said wall having at its outer periphery a curved transition portion, said liquid nozzle being centrally located in said wall and having a cone angle of less than 100°.

References Cited

UNITED STATES PATENTS

| | | | |
|---|---|---|---|
| 2,749,706 | 6/1956 | Goddard | 60—265 |
| 2,774,216 | 12/1956 | Allen | 60—258 |
| 3,169,368 | 2/1965 | Munding. | |

CARLTON R. CROYLE, Primary Examiner

DOUGLAS HART, Assistant Examiner

U.S. Cl. X.R.

60—39, 211, 204